US012136386B2

(12) United States Patent
Yin et al.

(10) Patent No.: US 12,136,386 B2
(45) Date of Patent: Nov. 5, 2024

(54) DISPLAY DEVICE CAPABLE OF IN-DISPLAY SENSING

(71) Applicant: Guangzhou Tyrafos Semiconductor Technologies Co., Ltd., Guangzhou (CN)

(72) Inventors: Ping-Hung Yin, Hsinchu (TW); Jia-Shyang Wang, Miaoli County (TW); Shih-Chan Tai, Kaohsiung (TW)

(73) Assignee: Guangzhou Tyrafos Semiconductor Tech. Co., Ltd., Guangzhou (CN)

( * ) Notice: Subject to any disclaimer, the term of this patent is extended or adjusted under 35 U.S.C. 154(b) by 0 days.

(21) Appl. No.: 18/500,168

(22) Filed: Nov. 2, 2023

(65) Prior Publication Data

US 2024/0153447 A1 May 9, 2024

Related U.S. Application Data

(60) Provisional application No. 63/422,456, filed on Nov. 4, 2022.

(51) Int. Cl.
*G09G 3/32* (2016.01)
*G09G 3/3208* (2016.01)
(Continued)

(52) U.S. Cl.
CPC ............. *G09G 3/32* (2013.01); *G09G 3/3208* (2013.01); *G09G 3/3233* (2013.01); *G09G 3/3275* (2013.01); *G09G 2300/0819* (2013.01); *G09G 2300/0842* (2013.01); *G09G 2300/0852* (2013.01); *G09G 2300/0861* (2013.01); *G09G 2310/0208* (2013.01);
(Continued)

(58) Field of Classification Search
CPC ............. G09G 3/20; G09G 2320/0626; G09G 2360/144; G01J 1/4204; G01S 17/08; H02J 7/35
See application file for complete search history.

(56) References Cited

U.S. PATENT DOCUMENTS 6,067,062 A * 5/2000 Takasu ................. G09G 3/3648
257/E27.111
6,593,562 B1 * 7/2003 Parrish .............. H01L 27/14609
348/246

(Continued)

*Primary Examiner* — William Lu
(74) *Attorney, Agent, or Firm* — Lin & Associates Intellectual Property, Inc.

(57) ABSTRACT

The present invention is related to a display device, including: a plurality of sub-pixel areas, each including a sub-pixel circuit, each sub-pixel circuit including: a diode, configured to be in a forward-biasing state during a displaying phase of the sub-pixel circuit for emitting light and configured to be in a reverse-biasing state for sensing light of the sub-pixel circuit in a sensing phase; a driving transistor for driving the diode during the display phase; first to sixth transistors, gate control signals are applied to gates of the first to sixth transistors, so that the sub-pixel circuit switches between the display phase and the sensing phase; and a capacitor for storing a data voltage to be written to the diode in the display phase, wherein in the sensing phase the diode generates a photocurrent to an operational amplifier so that the operational amplifier outputs a photocurrent output signal.

12 Claims, 12 Drawing Sheets

(51) Int. Cl.
*G09G 3/3233* (2016.01)
*G09G 3/3275* (2016.01)

(52) U.S. Cl.
CPC ............... *G09G 2310/0251* (2013.01); *G09G 2310/0291* (2013.01); *G09G 2310/067* (2013.01); *G09G 2310/08* (2013.01); *G09G 2320/045* (2013.01); *G09G 2360/14* (2013.01); *G09G 2360/148* (2013.01)

(56) References Cited

U.S. PATENT DOCUMENTS 8,441,226 B2 * 5/2013 Ju .......................... H01M 10/44 320/101
10,564,718 B2 * 2/2020 Na .......................... G06T 7/514
10,969,877 B2 * 4/2021 Na ...................... G02F 1/13338
2007/0097358 A1 * 5/2007 Oon ..................... G09G 3/3413 356/218
2007/0190681 A1 * 8/2007 Lee ................... H01L 27/14689 438/54
2010/0141623 A1 * 6/2010 Nakanishi ............ G09G 3/3406 345/207
2010/0177075 A1 * 7/2010 Fish ..................... G09G 3/2014 345/207
2011/0012879 A1 * 1/2011 Uehata ................. G09G 3/3614 345/207
2011/0109605 A1 * 5/2011 Omori .................. G09G 3/3648 345/207
2011/0122098 A1 * 5/2011 Kurokawa ............... G09G 3/20 250/214 R
2011/0148835 A1 * 6/2011 Yamazaki ............ G09G 3/2003 345/207
2011/0273413 A1 * 11/2011 Woestenborghs .... G09G 3/3611 345/207
2011/0315859 A1 * 12/2011 Tanaka ................. G09G 3/3648 250/214 R
2012/0091321 A1 * 4/2012 Tanaka .................... G06F 3/042 250/208.2
2012/0112047 A1 * 5/2012 Brown .................. G06F 3/0412 250/214.1
2013/0003269 A1 * 1/2013 Kimura ............... H01L 27/1255 361/679.01
2014/0253539 A1 * 9/2014 Kline ................... G09G 3/3233 345/82
2017/0169796 A1 * 6/2017 Tai ....................... G09G 3/3233
2017/0287392 A1 * 10/2017 Lynch ................... G06F 3/0421
2017/0323481 A1 * 11/2017 Tran ..................... H04N 23/611
2018/0101035 A1 * 4/2018 Marotta ............... G09G 3/3406
2018/0184031 A1 * 6/2018 Morita ................... H04N 25/76
2018/0204516 A1 * 7/2018 Hwang ................ G09G 3/3258
2020/0258448 A1 * 8/2020 Hargreaves .......... G09G 3/3208
2021/0064090 A1 * 3/2021 Wen ...................... H01L 25/167
2021/0104574 A1 * 4/2021 Behringer ............... H01L 33/10
2021/0134855 A1 * 5/2021 Ghasemi .............. C12Q 1/6869
2022/0102583 A1 * 3/2022 Baumheinrich ... G02B 6/12004
2022/0155144 A1 * 5/2022 Malinge ................. H04N 25/77
2022/0229501 A1 * 7/2022 Suo ......................... G06F 3/042
2023/0168768 A1 * 6/2023 Sugawara ........... G06F 3/04166 345/173
2023/0316988 A1 * 10/2023 Hofrichter ............... G09G 3/32 345/55

* cited by examiner

DISPLAY DEVICE CAPABLE OF IN-DISPLAY SENSING

BACKGROUND OF THE INVENTION

1. Field of the Invention

The present invention relates generally to a display device, and more particularly, to a display device able to realize both display and sensing functions in the same sub-pixel circuit to provide an in-screen sensing function.

2. The Prior Arts

In general, a display device often only has a display function. Some display devices provides both display and touch functions. However, when sensing is required, for example, when an optical fingerprint sensor (OFPS) is used for sensing, the optical fingerprint sensor will need to be implemented as an independent device. In addition, when the optical sensing module is bonded under the display device, there will be additional cost, additional thickness, and additional yield risk during bonding.

Moreover, since the sensing area depends on the area of the sensor, the sensing area will be much smaller than the area of the entire panel. In addition, since the optical sensing module is attached to the bottom of the display device, components between the sensed object and the sensor may block the light.

Therefore, it is necessary to provide a display device that can integrate the sensing function and the display function in the same sub-pixel circuit to overcome the above problems.

SUMMARY OF THE INVENTION

In order to achieve the objective of effectively solving the above problems, the present invention provides a display device, including: a plurality of sub-pixel areas, each including a sub-pixel circuit, each sub-pixel circuit including: a diode, configured to a forward-biasing state in a display phase of the sub-pixel circuit for emitting light and configured to a reverse-biasing state for sensing the light of the sub-pixel circuit in a sensing phase; a driving transistor, for driving the diode in the display phase; first to sixth transistors, gates of the first to sixth transistors being applied with gate control signals, so that the first to sixth transistors switch between the display phase and the sensing phase; and a capacitor, for storing a data voltage to be written to the diode in the display phase; wherein the diode generates a photocurrent to an operational amplifier during the sensing phase so that the operational amplifier outputs a photocurrent output signal.

Preferably, the operational amplifier comprises: a first input terminal connected to a fifth node; a second input terminal applied with a reference voltage; and an output terminal to output the a photocurrent output signal, wherein a feedback capacitor is connected to the first input terminal and the output terminal, and wherein a switch is connected to the first input terminal and the output terminal.

Preferably, in each sub-pixel circuit: a first electrode of the first transistor is connected to a first node, and a second electrode of the first transistor is connected to a fifth node; an initialization voltage is applied to the fifth node; a first electrode of the second transistor is connected to the fifth node, and a second electrode of the second transistor is connected to a second node; a first electrode of the third transistor is connected to the fifth node, and a second electrode of the third transistor is connected to a third node; a first electrode of the fourth transistor is applied with a data voltage, and a second electrode of the fourth transistor is connected to a fourth node; a first electrode of the fifth transistor is connected to the third node, and a second electrode of the fifth transistor is connected to the second node; a first electrode of the sixth transistor is connected to a driving voltage, and a second electrode of the sixth transistor is connected to the fourth node, a gate of the driving transistor is connected to the first node, a first electrode is connected to the fourth node, and a second electrode of the driving transistor is connected to the third node; a first electrode of the capacitor is connected to a first node, and a second electrode of the capacitor is connected to the first electrode of the sixth transistor; and, a first electrode of the diode is connected to the second node, and a common voltage is applied to the second electrode of the diode.

Preferably, in the sensing phase, the first and second transistors are on, and the third to sixth transistors are off.

Preferably, the sensing phase comprises: a first sensing phase, the switch is short-circuit; and a second sensing phase, the switch is open-circuit, wherein, in the first sensing phase, the initialization voltage is equal to the reference voltage.

Preferably, the display device further comprises: a first circuit, for applying the gate control signals to each sub-pixel circuit to switch each sub-pixel circuit between the display phase and the sensing phase respectively; and a second circuit, for applying the initialization voltage, the data voltage, the driving voltage, and the common voltage, the second circuit comprising a readout part, and the readout part comprising the operational amplifier.

Preferably, the gate control signals comprise: a first gate control signal to control the first transistor and the second transistor; a second gate control signal to control the third transistor and the fourth transistor; and a third gate control signal to control the fifth transistor and the sixth transistor.

Preferably, the diode comprises one of a micro light-emitting diode (micro-LED), a sub-millimeter light-emitting diode (mini-LED), and an organic light-emitting diode (OLED).

Preferably, the driving transistor and the first to sixth transistors comprise one of or any combination of P-type metal oxide semiconductor field effect transistors (MOSFET), N-type MOSFETs, thin film transistors (TFT), low-temperature polycrystalline silicon TFTs, and low-temperature polycrystalline oxide TFTs.

The present invention will be apparent to those skilled in the art by reading the following detailed description of a preferred embodiment thereof, with reference to the attached drawings.

DETAILED DESCRIPTION OF THE PREFERRED EMBODIMENT

Figure 1A:
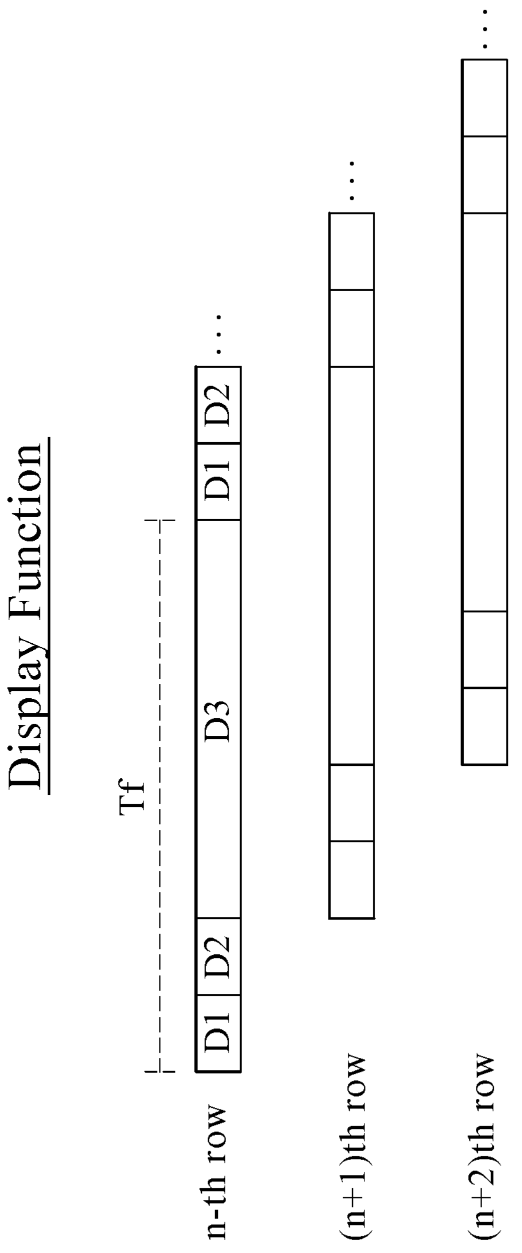
FIG. 1A is an operation timing diagram of a display device with only a display function.

The accompanying drawings are included to provide a further understanding of the invention, and are incorporated in and constitute a part of this specification. The drawings illustrate embodiments of the invention and, together with the description, serve to explain the principles of the invention.

The inventive concept will be explained more fully hereinafter with reference to the accompanying drawings in which exemplary embodiments of the inventive concept are shown. Advantages and features of the inventive concept and methods for achieving the same will be apparent from the following exemplary embodiments, which are set forth in more details with reference to the accompanying drawings. However, it should be noted that the present inventive concept is not limited to the following exemplary embodiments, but may be implemented in various forms. Accordingly, the exemplary embodiments are provided merely to disclose the inventive concept and to familiarize those skilled in the art with the type of the inventive concept. In the drawings, exemplary embodiments of the inventive concepts are not limited to the specific examples provided herein and are exaggerated for clarity.

The terminology used herein is used to describe particular embodiments only, and is not intended to limit the present invention. As used herein, the singular terms "a" and "the" are intended to include the plural forms as well, unless the context clearly dictates otherwise. As used herein, the term "and/or" includes any and all combinations of one or more of the associated listed items. It will be understood that when an element is referred to as being "connected" or "coupled" to another element, it can be directly connected or coupled to the other element or intervening elements may be present.

Similarly, it will be understood that when an element (e.g., a layer, region, or substrate) is referred to as being "on" another element, it can be directly on the other element or intervening elements may be present. In contrast, the term "directly" means that no intervening elements are present. It should be further understood that when the terms "comprising" and "including" are used herein, it is intended to indicate the presence of stated features, steps, operations, elements, and/or components, but does not exclude one or more other features, steps, operations, elements, components, and/or the presence or addition of groups thereof.

Furthermore, exemplary embodiments in the detailed description are set forth in cross-section illustrations that are idealized exemplary illustrations of the present inventive concepts. Accordingly, the shapes of the exemplary figures may be modified according to manufacturing techniques and/or tolerable errors. Therefore, the exemplary embodiments of the present inventive concept are not limited to the specific shapes shown in the exemplary figures, but may include other shapes that may be produced according to the manufacturing process. The regions illustrated in the figures have general characteristics and are used to illustrate specific shapes of elements. Therefore, this should not be considered limited to the scope of this creative concept.

It will also be understood that, although the terms "first," "second," "third," etc. may be used herein to describe various elements, these elements should not be limited by these terms. These terms are only used to distinguish each element. Thus, a first element in some embodiments could be termed a second element in other embodiments without departing from the teachings of the present creation. Exemplary embodiments of aspects of the present inventive concept illustrated and described herein include their complementary counterparts. Throughout this specification, the same reference numbers or the same designators refer to the same elements.

Furthermore, example embodiments are described herein with reference to cross-sectional and/or planar views, which are illustrations of idealized example illustrations. Accordingly, deviations from the shapes shown, for example, caused by manufacturing techniques and/or tolerances, are expected. Accordingly, the exemplary embodiments should not be considered limited to the shapes of the regions shown herein, but are intended to include deviations in shapes resulting from, for example, manufacturing. Thus, the regions illustrated in the figures are schematic and their shapes are not intended to illustrate the actual shape of a region of a device and are not intended to limit the scope of example embodiments.

It should be noted that the sub-pixel circuit of the present invention can be implemented in any sub-pixel such as red sub-pixel, blue sub-pixel, green sub-pixel, white sub-pixel, etc., but the present invention is not limited thereto.

Refer to FIG. 1A. FIG. 1A is an operation timing diagram of a display device with only a display function. As shown in FIG. 1A, the display device with only a display function is displayed in a row-by-row manner, from the upper left corner to the lower right corner, and finally forms an image frame. One frame time Tf includes: the first display phase D1, which is used to initialize the circuit; the second display phase D2, which is used to write data; and the third display phase D3, which is used to emit light to display data. Since the display device only has a display function, one frame time Tf is equal to the sum of the first display phase D1 to the third display phase D3.

It should be understood that when the circuit is actually operating, there will be switching time between each phase. For ease of understanding, in this specification, the duration of each phase includes the actual execution of the corresponding action and switching to the next phase. For example, the second display phase D2 includes the time of writing data and switching to the third display phase D3.

Figure 1B:
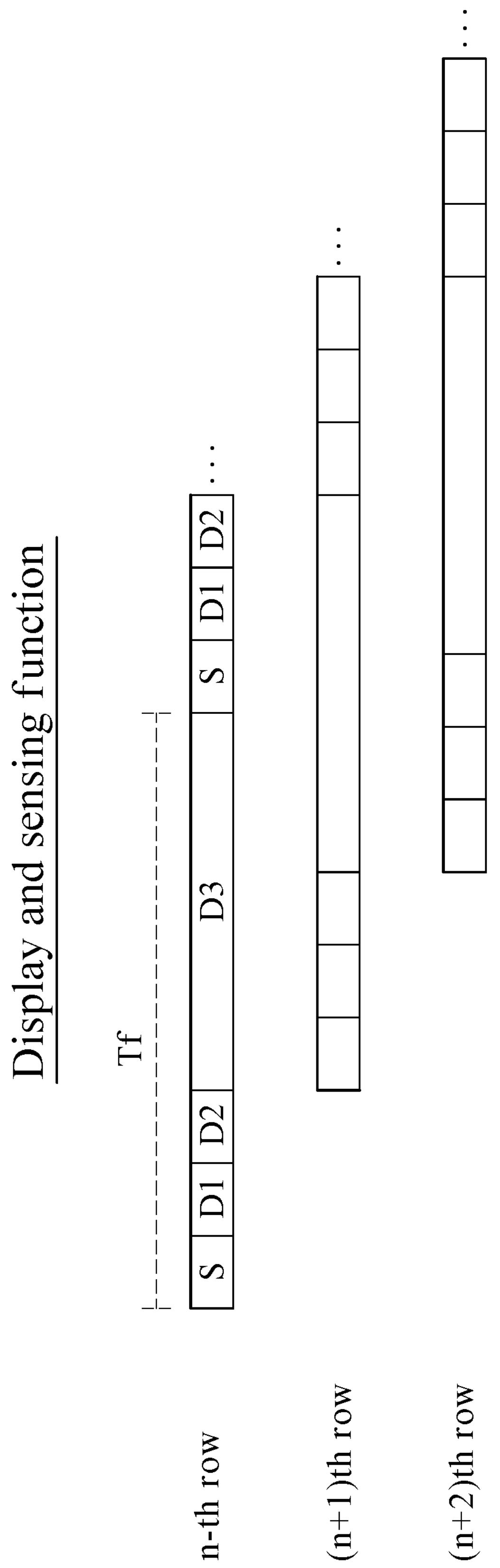
FIG. 1B is an operation timing diagram of the display device of the present invention.

Refer to FIG. 1B, which is an operation timing diagram of the display device of the present invention. Since the present invention integrates the sensing function and the display function into the same sub-pixel circuit in the display device, the frame time Tf of the present invention further includes a sensing phase S for sensing data. Therefore, through the design of the circuit and the control of the gate control signal, the operation timing of the display device of the present invention is adjusted to include the sensing phase S and the display phase, which includes the first display phase D1 to the third display phase D3.

It can be understood that, according to the user's settings, at the same point in time, the sub-pixel circuits in the display device may be in different phases. For example, the sub-pixel circuits in different rows may be in different phases. In addition, since the sensing phase S and the display phase D1-D3 of the present invention are achieved by controlling the gate control signal GCS to adjust the operating sequence, the sensor of the display device can be turned on or off the sensing phase S at any time according to the user's settings and needs.

Figure 2:
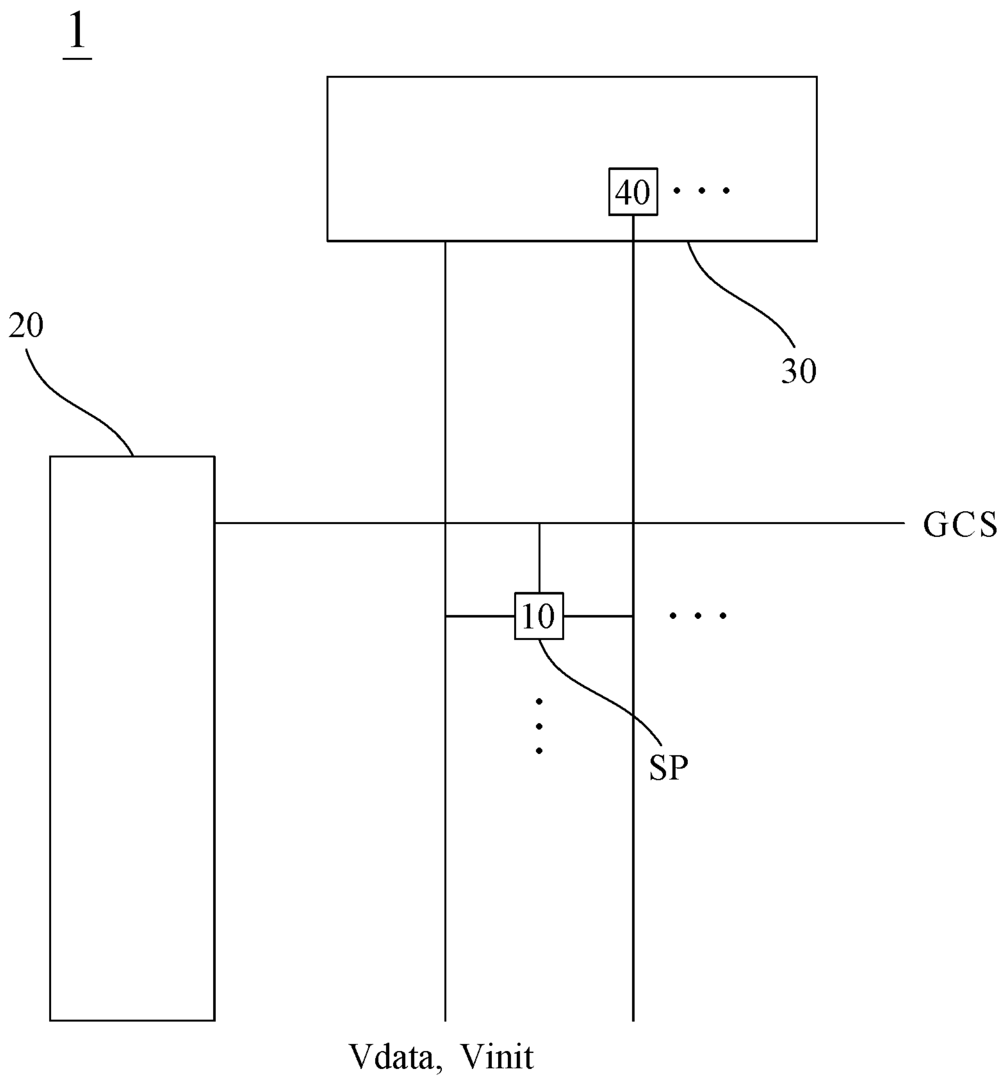
FIG. 2 is a structural diagram of a display device according to a first embodiment of the present invention.

Refer to FIG. 2, which is a structural diagram of a display device 1 according to an embodiment of the present invention, comprising: a plurality of sub-pixel areas SP, each including a sub-pixel circuit 10; a first circuit 20, by applying a gate control signal GCS to each sub-pixel circuit 10, so that each sub-pixel circuit 10 switches between the display phases D1 to D3 and the sensing phase S respectively. For example, the first circuit 20 can be a row circuit; and the second circuit 30 is used to apply the initialization voltage Vinit and data voltage Vdata and includes a readout part for reading out the light sensed by the diode LED in the sensing phase S of the sub-pixel circuit 10. For example, the second circuit 30 may be a column circuit. The readout part includes a plurality of readout circuits 40, so that the plurality of sub-pixel circuits 10 in each row have respective corresponding readout circuits 40 for reading out the light sensed by the diode LED of the sub-pixel circuit 10 in the sensing phase S of the sub-pixel circuit 10.

Figure 3:
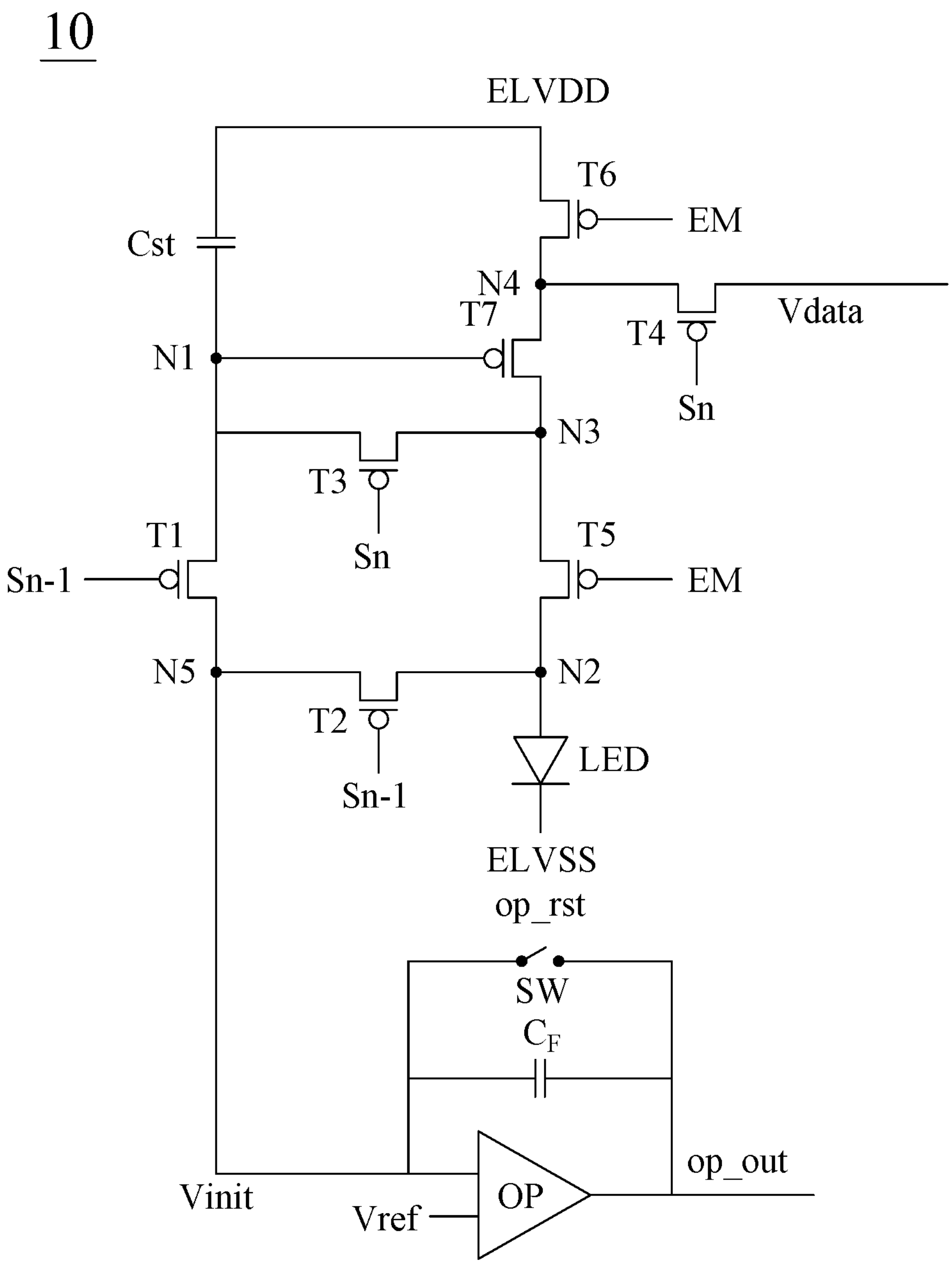
FIG. 3 is a circuit diagram of a sub-pixel circuit according to the first embodiment of the present invention.
Figure 4:
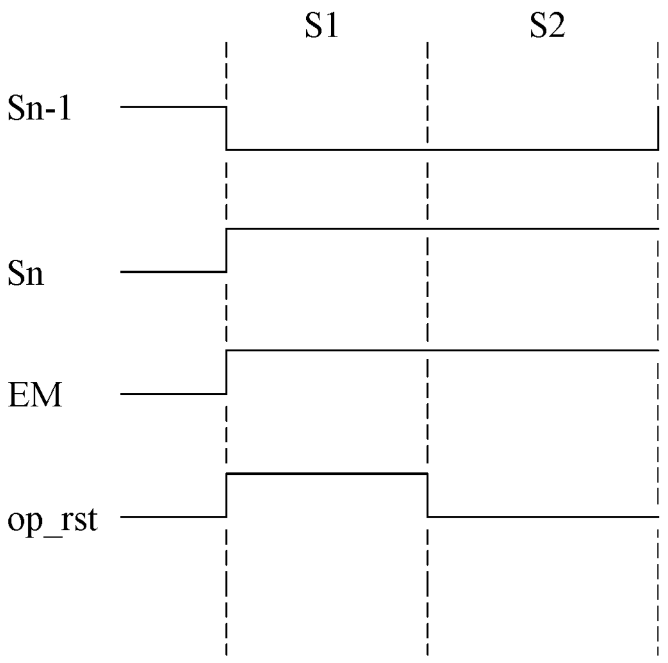
FIG. 4 is a timing operation diagram illustrating the sensing phase of the sub-pixel circuit according to the first embodiment of the present invention.
Figure 5:
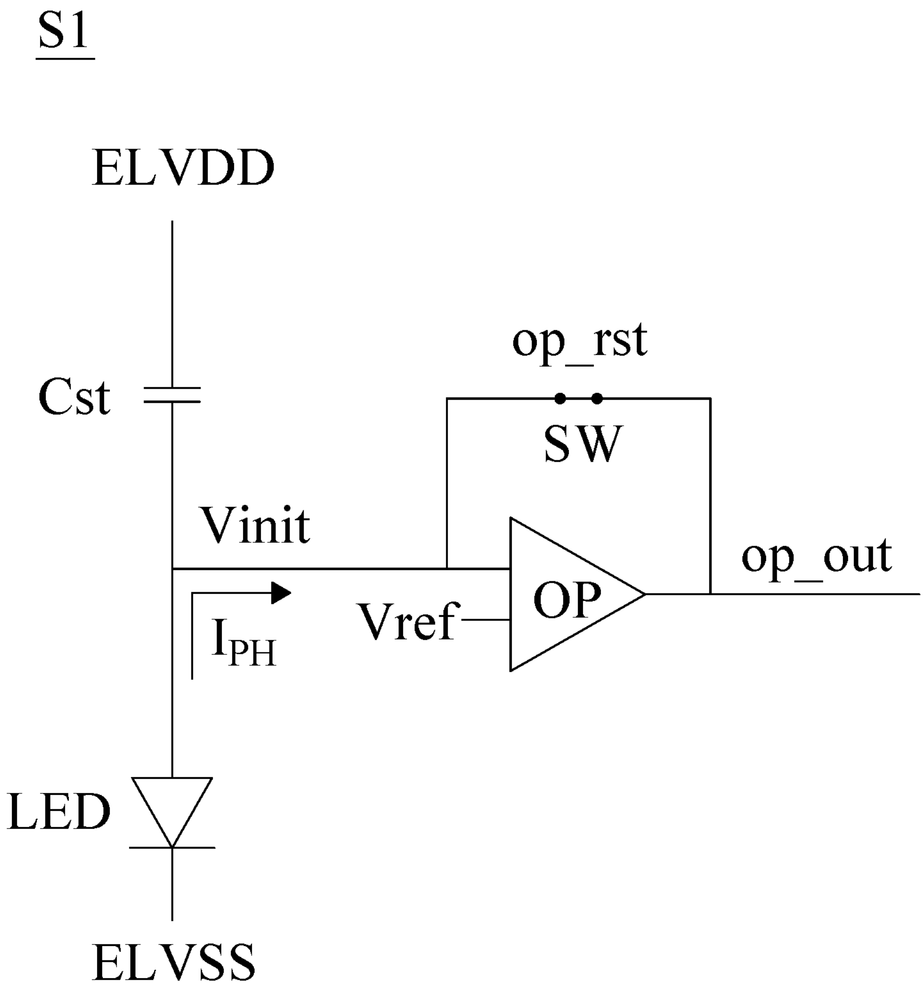
FIG. 5 is an equivalent circuit diagram of the first sensing phase of the sub-pixel circuit according to the first embodiment of the present invention.
Figure 6:
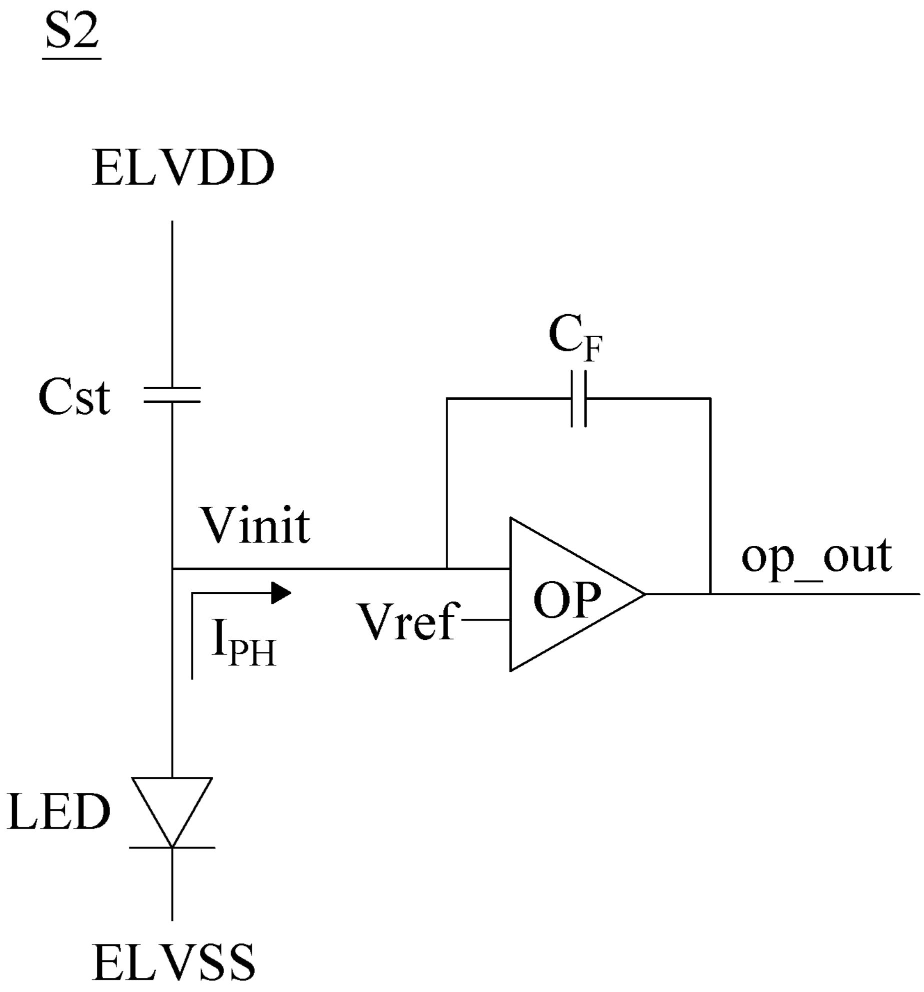
FIG. 6 is an equivalent circuit diagram of the second sensing phase of the sub-pixel circuit according to the first embodiment of the present invention.

Refer to FIGS. 3 to 6. FIG. 3 is a circuit diagram of a sub-pixel circuit according to the first embodiment of the present invention; FIG. 4 is a timing operation diagram illustrating the sensing phase S of the sub-pixel circuit 10 according to the first embodiment of the present invention; FIG. 5 is an equivalent circuit diagram of the first sensing phase S1 of the sub-pixel circuit 10 according to the first embodiment of the present invention; FIG. 6 is an equivalent circuit diagram of the second sensing phase S2 of the sub-pixel circuit 10 according to the first embodiment of the present invention.

Referring to FIG. 3, the sub-pixel circuit 10 of the present invention includes: first to sixth transistors T1 to T6; a driving transistor T7; a diode LED; and a capacitor Cst. The gate control signals GCS include a first gate control signal Sn−1, a second gate control signal Sn, and a third gate control signal EM. The first transistor T1 is controlled by the first gate control signal Sn−1, the second transistor T2 is controlled by the first gate control signal Sn−1, the third transistor T3 is controlled by the second gate control signal Sn, the fourth transistor T4 is controlled by the second gate control signal Sn, the fifth transistor T5 is controlled by the third gate control signal EM, and the sixth transistor T6 is controlled by the third gate control signal EM. In addition, the data voltage Vdata, the initialization voltage Vinit, the driving voltage ELVDD, and the common voltage ELVSS are applied to the sub-pixel circuit 10.

Referring to FIGS. 3 and 5-6, the sub-pixel circuit 10 of the present invention also includes: an operational amplifier OP, which can be used to receive the photocurrent $I_{PH}$ generated by the diode LED, thereby generating a photocurrent output signal op_out. In another embodiment, the operational amplifier OP may be disposed outside of the sub-pixel circuit 10. For example, the operational amplifier OP may be disposed in the readout part of the second circuit 30. Also, for example, the operational amplifier OP may be disposed in the readout circuit 40, but the present invention not limited thereto. For example, when the operational amplifier OP is disposed in the readout circuit 40, all the diode LEDs in a column share one operational amplifier OP, and all the diode LEDs in the column output signal in a time-sharing manner through the operation amplifier OP corresponding to the column.

Referring to FIG. 3, in the sub-pixel circuit 10, the first electrode of the first transistor T1 is connected to the first node N1, the second electrode of the first transistor T1 is connected to the fifth node N5, and the initialization voltage Vinit is applied to the fifth node N5; the first electrode of the second transistor T2 is connected to the fifth node N5, and the second electrode of the second transistor T2 is connected to the second node N2; the first electrode of the third transistor T3 is connected to the first node N1, and the second electrode of the third transistor T3 is connected to the third node N3; the first electrode of the fourth transistor T4 is applied with the data voltage Vdata, and the second electrode of the fourth transistor T4 is connected to the fourth node N4; The first electrode of the fifth transistor T5 is connected to the third node N3, and the second electrode of the fifth transistor T5 is connected to the second node N2; the first electrode of the sixth transistor T6 is connected to the driving voltage ELVDD, and the second electrode of the sixth transistor T6 is connected to the fourth node N4; the gate electrode of the driving transistor T7 is connected to the first node N1, the first electrode of the driving transistor T7 is connected to the fourth node N4, and the second electrode of the driving transistor T7 is connected to the third node N3; the first electrode of the capacitor Cst is connected to the first node N1, and the second electrode of the capacitor Cst is connected to the first electrode of the sixth transistor T6; and the first electrode of the diode LED is connected to the second node N2 and the common voltage ELVSS is applied to the second electrode of the diode LED.

Referring also to FIG. 3, in the sub-pixel circuit 10, the operational amplifier OP may include: a first input terminal, connected to the fifth node N5, which can be used to receive the photocurrent $I_{PH}$ emitted by the diode LED; a second input terminal, applied with the reference voltage Vref; and an output terminal, for outputting the photocurrent output signal op_out during the sensing phase. The first input terminal may be a negative input terminal, and the second input terminal may be a positive input terminal, but is not limited thereto. In addition, the first input terminal and the output terminal of the operational amplifier OP can be connected to the switch SW, and the switch SW is short-circuited or open-circuited by applying the switch control signal op_rst for resetting or initializing the circuit. Furthermore, the first input terminal and the output terminal of the operational amplifier OP can be connected to the feedback capacitor $C_F$, so that the operational amplifier OP functions as an integrator and integrates the input photocurrent $I_{PH}$.

It should be noted that the display device of the present invention divides the sub-pixel circuit 10 into the sensing phase S and the display phases D1 to D3 by applying the gate control signals GCS. In the sensing phase S, the diode LED is under reverse bias to sense light as a photodiode and generate a photocurrent $I_{PH}$. Then, the operational amplifier OP receives the photocurrent $I_{PH}$ and generates a photocurrent output signal op_out. In the display phases D1 to D3, the diode LED is under forward bias to emit light as a light-emitting diode to display data according to the data voltage Vdata. It can be understood that the diode LED of the present invention includes, but is not limited to, micro-light-emitting diodes (micro-LED), sub-millimeter light-emitting diodes (mini-LED), and organic light-emitting diodes (OLED).

The circuit operation of the sensing phase S of the sub-pixel circuit 10 according to the first embodiment of the present invention will be described below with reference to FIGS. 3 to 6.

Referring to FIG. 4, the sensing phase S of the present invention includes: a first sensing phase S1, used to initialize the diode LED, so that the diode LED is under reverse bias to sense light as a photodiode and generate the photocurrent $I_{PH}$; and in the second sensing phase S2, the operational amplifier OP receives the photocurrent $I_{PH}$, performs an integral operation, and generates the photocurrent output signal op_out.

It should be understood that the first embodiment of the present invention uses a P-type metal oxide semiconductor field effect transistor (PMOS) as an exemplary transistor in the sub-pixel circuit 10, so a high voltage is applied to the gate will turn the transistor off, while applying a low voltage to the gate will turn it on. However, the present invention is not limited thereto. The transistor used in the sub-pixel circuit of the present invention can be arbitrarily implemented as PMOS, N-type metal oxide semiconductor field effect transistor (NMOS), thin film transistor (TFT), low-temperature polycrystalline silicon (LTPS) TFT, low-temperature polycrystalline Oxide (LTPO) TFT and so on. In addition, transistors can also be arbitrarily combined to form the sub-pixel circuit of the present invention. For example, some transistors are implemented as PMOS and other transistors are implemented as NMOS.

Specifically, referring to FIGS. 3 to 5, in the first sensing phase S1, under the control of the first gate control signal Sn−1, the second gate control signal Sn, and the third gate control signal EM, the first transistor T1 and the second transistor T2 are on, while the third transistor T3, the fourth transistor T4, the fifth transistor T5, and the sixth transistor T6 are off; and according to the switch control signal op_rst, the switch SW is short-circuited, so that the initialization voltage Vinit is equal to the reference voltage Vref input to the second input terminal of the operational amplifier OP. Therefore, the initialization voltage Vinit can be used to put the diode LED in a reverse-biasing state to sense light as a photodiode and generate a photocurrent $I_{PH}$. The switch of the present invention is designed to be short-circuited when a high voltage is applied to the control end, and open-circuited when a low voltage is applied to the control end.

Specifically, referring to FIGS. 3, 4, and 6, in the second sensing phase S2, under the control of the first gate control signal Sn−1, the second gate control signal Sn, and the third gate control signal EM, the first transistor T1 and the second transistor T2 remain on, while the third transistor T3, the fourth transistor T4, the fifth transistor T5, and the sixth transistor T6 remains off; and according to the switch control signal op_rst, the switch SW is switched to open-circuit. At this point, the operational amplifier OP, in conjunction with the feedback capacitor $C_F$ connected to its first input terminal and output terminal, acts as an integrator to perform integration of the photocurrent $I_{PH}$ input to its first input terminal, thereby outputting a photocurrent output signal op_out at its output terminal. In one embodiment, the photocurrent output signal op_out output from the output terminal of the operational amplifier OP can be input to an analog-to-digital converter (ADC) (not shown in the figure) to perform analog-to-digital signal conversion to facilitate subsequent signal processing and analysis. The analog-to-digital converter may be provided in the readout circuit 40, but is not limited thereto. For example, when the ADC is disposed in the readout circuit 40, the operational amplifier OP in each column corresponds to an analog-to-digital converter, and the photocurrent output signal op_out of the operational amplifier OP in the column is input to the ADC corresponding to the column to perform analog-to-digital signal conversion.

Figure 7:
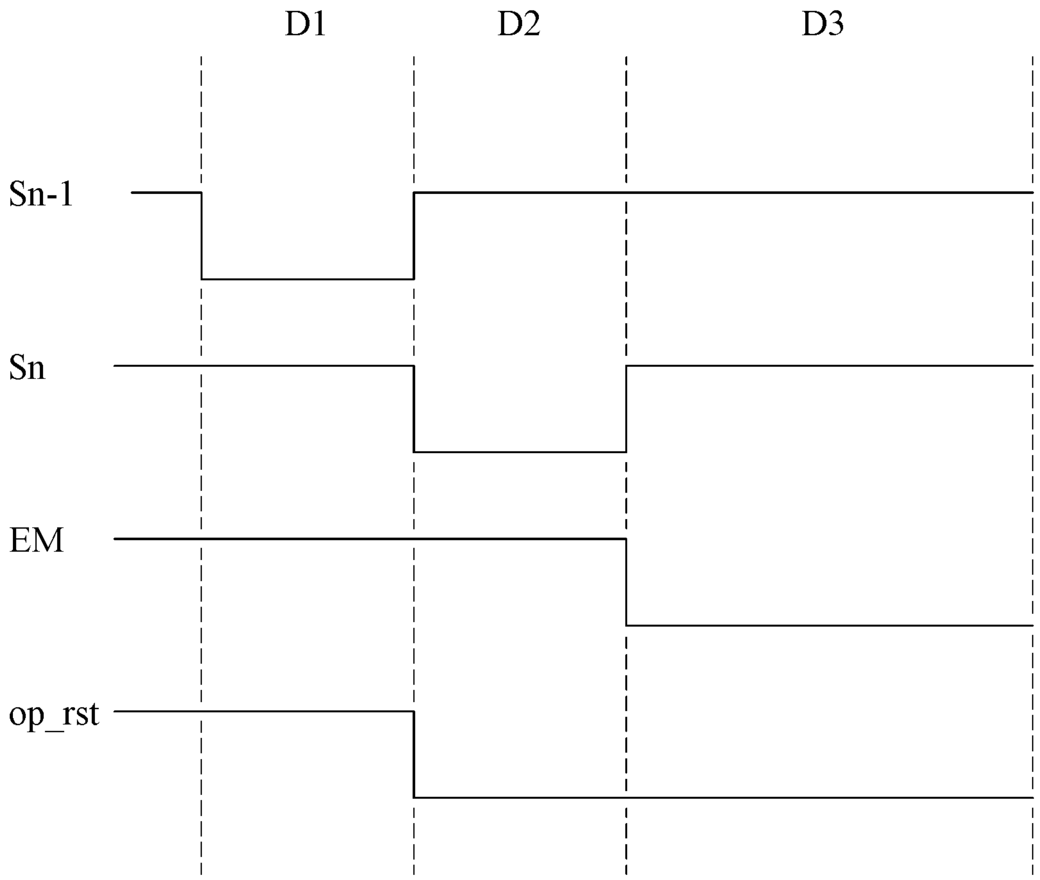
FIG. 7 is a timing operation diagram illustrating the display phase of the sub-pixel circuit according to the first embodiment of the present invention.
Figure 8:
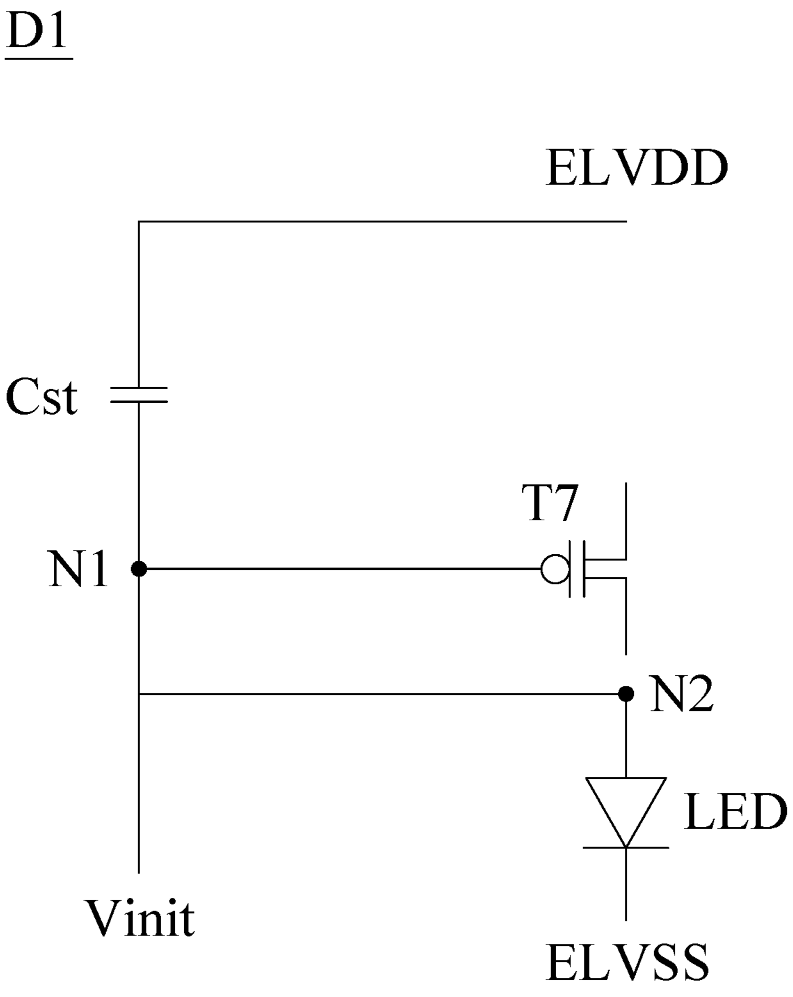
FIG. 8 is an equivalent circuit diagram of the first display phase of the sub-pixel circuit according to the first embodiment of the present invention.
Figure 9:
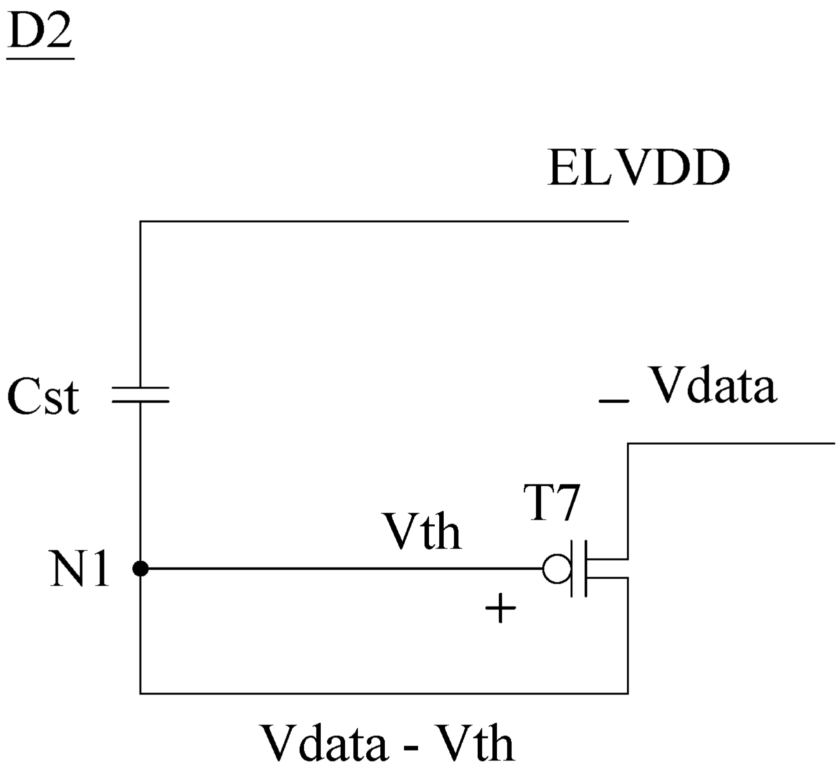
FIG. 9 is an equivalent circuit diagram of the second display phase of the sub-pixel circuit according to the first embodiment of the present invention.
Figure 10:
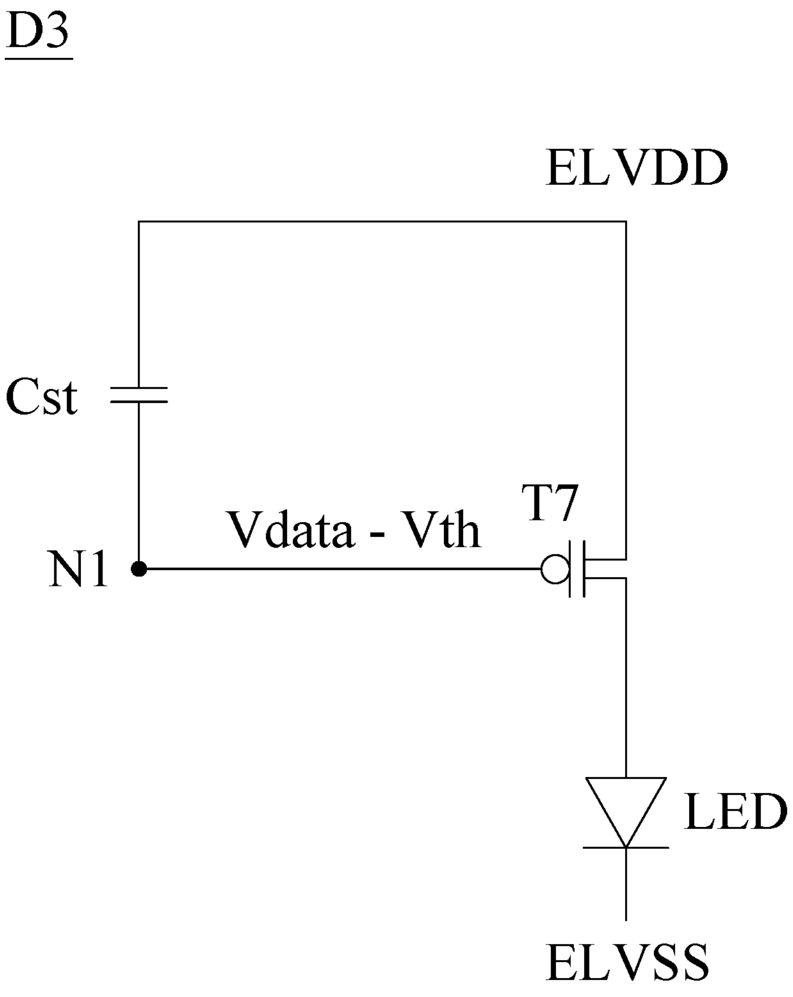
FIG. 10 is an equivalent circuit diagram of the third display phase of the sub-pixel circuit according to the first embodiment of the present invention.

The circuit operation of the display phases D1-D3 of the sub-pixel circuit 10 according to the first embodiment of the present invention will be described below with reference to FIGS. 3 and 7-10. FIG. 7 is a timing operation diagram illustrating the display phase D1-D3 of the sub-pixel circuit 10 according to the first embodiment of the present invention; FIG. 8 is an equivalent circuit diagram of the first display phase D1 of the sub-pixel circuit according to the first embodiment of the present invention; FIG. 9 is an equivalent circuit diagram of the second display phase D2 of the sub-pixel circuit 10 according to the first embodiment of the present invention; FIG. 10 is an equivalent circuit diagram of the third display phase D3 of the sub-pixel circuit 10 according to the first embodiment of the present invention.

Referring to FIG. 7, the display phases D1-D3 of the present invention include: the first display phase D1, for initializing the diode LED and the second node N2 with the initialization voltage Vinit; the second display phase D2, for writing the data voltage Vdata into the capacitor Cst; and the third display phase D3, for driving the driving electrode body T7 with the voltage stored in the capacitor Cst, so that the driving current flows from the driving voltage ELVDD to the common voltage ELVSS, and thereby the diode LED emits light.

Specifically, referring to FIGS. 3, 7, and 8, in the first display phase D1, under the control of the first gate control signal Sn−1, the second gate control signal Sn, and the third gate control signal EM, the first transistor T1 and the second transistor T2 are turned on, and the third transistor T3, the fourth transistor T4, the fifth transistor T5, and the sixth transistor T6 are turned off; and according to the switch control signal op_rst, the switch SW is short-circuited, so that the initialization voltage Vinit is equal to the reference voltage Vref input to the second input terminal of the operational amplifier OP. Therefore, the diode LED and the second node N2 can be initialized with the initialization voltage Vinit.

Specifically, with reference to FIGS. 3, 7, and 9, in the second display phase D2, under the control of the first gate control signal Sn−1, the second gate control signal Sn, and the third gate control signal EM, the third transistor T3 and the fourth transistor T4 are on, and the first transistor T1, the second transistor T2, the fifth transistor T5, and the sixth transistor T6 are off; and according to the switch control signal op_rst, the switch SW is switched to off. Therefore, the data voltage Vdata is stored in the first node N1 through the driving transistor T7, and is written to the capacitor Cst in the form of the data voltage Vdata minus the threshold voltage Vth.

Specifically, with reference to FIGS. 3, 7, and 10, in the third display phase D3, under the control of the first gate control signal Sn−1, the second gate control signal Sn, and the third gate control signal EM, the fifth transistor T5 and the sixth transistor T6 are on, and the first transistor T1, the second transistor T2, the third transistor T3, and the fourth transistor T4 are off; and according to the switch control signal op_rst, the switch SW remains open-circuited. Therefore, in the third display phase D3, the data voltage Vdata minus the threshold voltage Vth written to the capacitor Cst will be used as the gate voltage of the driving transistor T7, and due to the circuit design, the overdrive voltage of the driving transistor T7 will be ELVDD−Vdata+Vth minus the threshold voltage Vth. Therefore, the current flowing through the diode LED will only be controlled by ELVDD−Vdata and will not be affected by the threshold voltage Vth of the individual drive transistor T7. At this point, the diode LED is driven by the voltage difference, i.e., ELVDD−Vdata, to a forward-biasing state and emits light.

Figure 11:
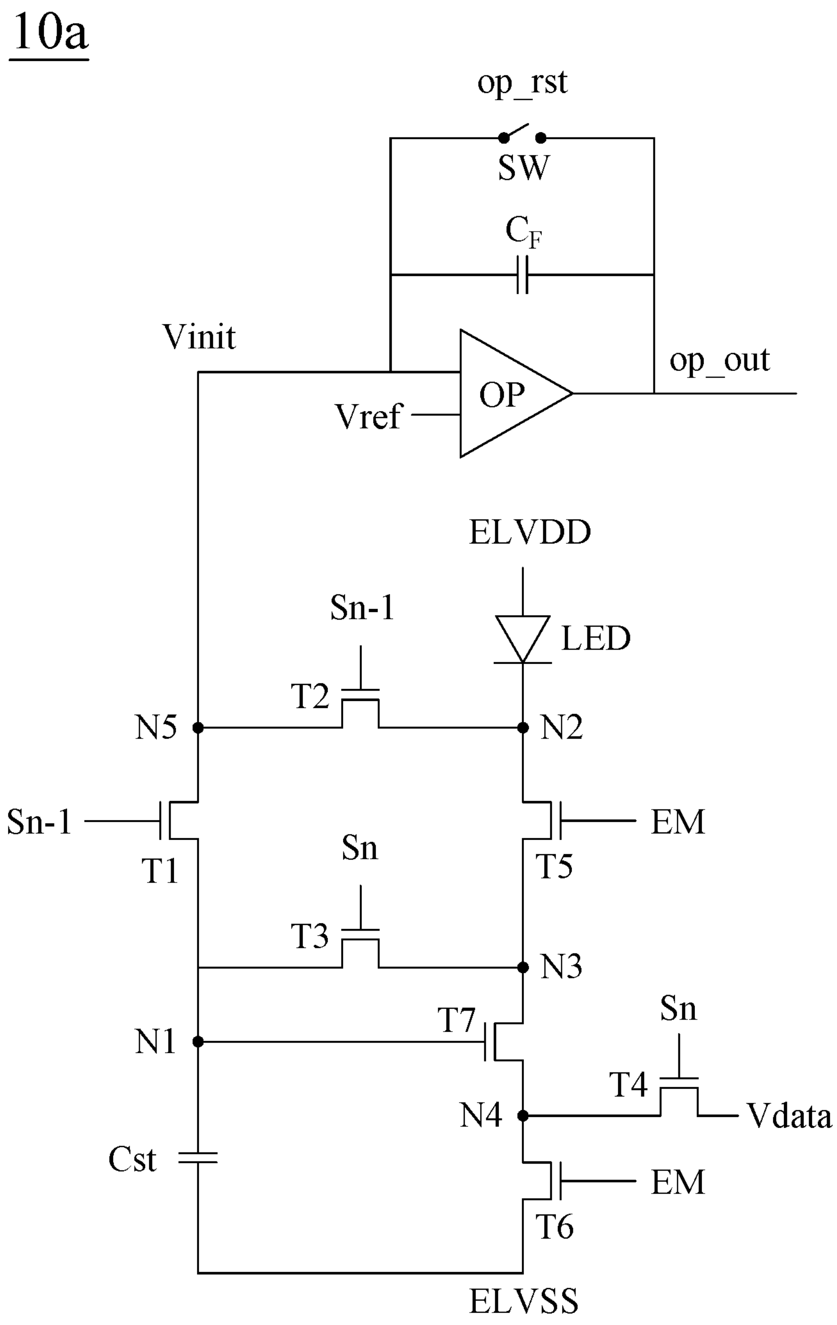
FIG. 11 is a circuit diagram of a pixel circuit according to a second embodiment of the present invention.

Referring to FIG. 11, FIG. 11 is a circuit diagram of a sub-pixel circuit 10*a* according to a second embodiment of the present invention. The difference between the sub-pixel circuit 10*a* and the sub-pixel circuit 10 is that the sub-pixel circuit 10*a* uses NMOS instead of PMOS as the first to sixth transistors T1 to T6 and the driving transistor T7. Other components that are the same as those of the sub-pixel circuit 10 will not be described here.

Therefore, it should be understood that the first to sixth transistors T1 to T6, the driving transistor T7, and the switch SW of the sub-pixel circuit 10*a* are also driven in the same manner as the sub-pixel circuit 10. That is, in the first sensing phase S1, the first transistor T1 and the second transistor T2 are on, the third transistor T3, the fourth transistor T4, the fifth transistor T5, and the sixth transistor are T6 are off, and the switch SW is short-circuited. In the second sensing phase S2, the first transistor T1 and the second transistor T2 remain on, and the third transistor T3, the fourth transistor T4, the fifth transistor T5, and the sixth transistor T6 remain off, and the switch SW is switched to open-circuited. In the first display phase D1, the first transistor T1 and the second transistor T2 are on, the third transistor T3, the fourth transistor T4, the fifth transistor T5, and the sixth transistor T6 are off, and the switch SW is short-circuited. In the second display phase D2, the third transistor T3 and the fourth transistor T4 are on, the first transistor T1, the second transistor T2, the fifth transistor T5, and the sixth transistor T6 are off, and the switch SW is switched to open-circuited. In the third display phase D3, the fifth transistor T5 and the sixth transistor T6 are on, the first transistor T1, the second transistor T2, the third transistor T3, and the fourth transistor T4 are off, and the switch SW remains open-circuited.

As such, the sub-pixel circuit 10*a* can also realize: in the sensing phase S, the diode LED is placed in a reverse-biasing state to sense light as a photodiode to generate a photocurrent $I_{PH}$. Then, the operational amplifier OP receives the photocurrent $I_{PH}$ and generates the photocurrent output signal op_out. In the display phases D1 to D3, the diode LED is under forward bias to emit light as a light-emitting diode to display data according to the data voltage Vdata to determine the luminous intensity.

Therefore, those skilled in the art can easily understand that the inventive concept of the present invention can be applied to sub-pixel circuits using various types of transistors without being limited by the characteristics of the transistors.

Finally, the technical features of the present invention and its achievable technical effects are summarized as follows:

First, the display device of the present invention can realize both display and sensing functions in the same sub-pixel circuit to have an in-screen sensing function.

Second, since the display device of the present invention uses the same sub-pixel circuit to realize both display and sensing functions at the same time, there is no element between the sensed object and the sensor that will block or reduce the light. Therefore, the present invention can achieve more accurate sensing.

Third, since the display device of the present invention uses the same sub-pixel circuit to achieve both display and sensing functions, the total thickness of the screen is thinner, redundant manufacturing processes are not required, and the yield risk caused by additional bonding is reduced.

Fourth, three gate control signals are used to control six transistors, and thereby reducing the circuit complexity as well as cost so as to improve the manufacturing yield rate.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A display device, comprising:

a plurality of sub-pixel areas, each comprising a sub-pixel circuit, each sub-pixel circuit further comprising:

a diode, configured to a forward-biasing state in a display phase of the sub-pixel circuit for emitting light and configured to a reverse-biasing state to sense a light of the sub-pixel circuit in a sensing phase, the diode having first and second electrodes;

a driving transistor, for driving the diode in the display phase, the driving transistor having a gate and first and second electrodes;

first to sixth transistors, gates of the first to sixth transistors being applied with gate control signals, so that the first to sixth transistors switch between the display phase and the sensing phase, each of the first to six transistors having first and second electrodes;

a capacitor, for storing a data voltage to be written to the diode in the display phase, the capacitor having first and second electrodes, the second electrode of the capacitor being connected to the first electrode of the sixth transistor;

a first node connected to the first electrode of the first transistor, the first electrode of the capacitor, the first electrode of the third transistor and the gate of the driving transistor being connected to the first node;

a second node connected to the second electrode of the second transistor, the first electrode of the diode and the second electrode of the fifth transistor being connected to the second node;

a third node connected to the second electrode of the third transistor, the first electrode of the fifth transistor and the second electrode of the driving transistor being connected to the third node;

a fourth node connected to the second electrode of the fourth transistor, the second electrode of the sixth transistor and the first electrode of the driving transistor being connected to the fourth node;

a fifth node connected to the second electrode of the first transistor, an initialization voltage being applied to the fifth node, the first electrode of the second transistor being connected to the fifth node;

a data voltage applied to the first electrode of the fourth transistor;

a driving voltage applied to the first electrode of the sixth transistor; and a common voltage applied to the second electrode of the diode;

wherein the diode generates a photocurrent to an operational amplifier during the sensing phase so that the operational amplifier outputs a photocurrent output signal.

2. The display device according to claim 1, wherein the operational amplifier comprises:

a first input terminal connected to the fifth node;

a second input terminal applied with a reference voltage; and an output terminal to output the photocurrent output signal;

wherein a feedback capacitor is connected to the first input terminal and the output terminal; and wherein a switch is connected to the first input terminal and the output terminal.

3. The display device according to claim 2, wherein in the sensing phase, the first and second transistors are on, and the third to sixth transistors are off.

4. The display device according to claim 3, wherein the sensing phase comprises:

a first sensing phase, with the switch short-circuited; and a second sensing phase, with the switch open-circuited;

wherein, in the first sensing phase, the initialization voltage is equal to the reference voltage.

5. The display device according to claim 1, further comprising:

a first circuit, for applying the gate control signals to each sub-pixel circuit to switch each sub-pixel circuit between the display phase and the sensing phase respectively; and a second circuit, for applying the initialization voltage, the data voltage, the driving voltage, and the common voltage, the second circuit comprising a readout part, and the readout part comprising the operational amplifier.

6. The display device according to claim 5, wherein the gate control signals comprise:

a first gate control signal to control the first transistor and the second transistor;

a second gate control signal to control the third transistor and the fourth transistor; and a third gate control signal to control the fifth transistor and the sixth transistor.

7. The display device according to claim 6, wherein the operational amplifier comprises:

a first input terminal connected to the fifth node;

a second input terminal applied with a reference voltage; and an output terminal to output thea photocurrent output signal;

wherein a feedback capacitor is connected to the first input terminal and the output terminal; and wherein a switch is connected to the first input terminal and the output terminal.

8. The display device according to claim 7, wherein in the sensing phase, the first and second transistors are on, and the third to sixth transistors are off.

9. The display device according to claim 8, wherein the sensing phase comprises:

a first sensing phase, with the switch short-circuited; and a second sensing phase, with the switch open-circuited;

wherein, in the first sensing phase, the initialization voltage is equal to the reference voltage.

10. The display device according to claim 9, wherein the readout part further comprises an analog-to-digital converter for performing analog-to-digital conversion.

11. The display device according to claim 1, wherein the diode is one of a micro light-emitting diode, a sub-millimeter light-emitting diode, and an organic light-emitting diode.

12. The display device according to claim 1, wherein the driving transistor and the first to sixth transistors comprise one of or any combination of P-type metal oxide semiconductor field effect transistors (MOSFET), N-type MOSFETs, thin film transistors (TFT), low-temperature polycrystalline silicon TFTs, and low-temperature polycrystalline oxide TFTs.

* * * * *